(12) United States Patent
Barnstedt et al.

(10) Patent No.: US 12,473,850 B2
(45) Date of Patent: Nov. 18, 2025

(54) METHOD FOR OPERATING AN EXHAUST SYSTEM HAVING AN SCR CATALYTIC CONVERTER FOR AN INTERNAL COMBUSTION ENGINE, INTERNAL COMBUSTION ENGINE HAVING AN EXHAUST SYSTEM, AND A MOTOR VEHICLE HAVING AN INTERNAL COMBUSTION ENGINE

(71) Applicant: Bayerische Motoren Werke Aktiengesellschaft, Munich (DE)

(72) Inventors: Gert Barnstedt, Behamberg (AT); Michael Maurer, Ottensheim (AT); Lukas Stoeger, St. Peter in der Au (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/866,906

(22) PCT Filed: Jun. 14, 2023

(86) PCT No.: PCT/EP2023/065950
§ 371 (c)(1),
(2) Date: Nov. 18, 2024

(87) PCT Pub. No.: WO2024/012795
PCT Pub. Date: Jan. 18, 2024

(65) Prior Publication Data
US 2025/0314188 A1    Oct. 9, 2025

(30) Foreign Application Priority Data
Jul. 14, 2022 (DE) ............ 10 2022 117 681.9

(51) Int. Cl.
*F01N 3/20* (2006.01)

(52) U.S. Cl.
CPC .......... *F01N 3/208* (2013.01); *F01N 2610/02* (2013.01); *F01N 2900/1411* (2013.01);
(Continued)

(58) Field of Classification Search
CPC ................ F01N 3/208; F01N 2610/02; F01N 2900/1602; F01N 2900/1411; F01N 2900/1614
See application file for complete search history.

(56) References Cited

U.S. PATENT DOCUMENTS

| 2011/0094208 A1 | 4/2011 | Bauer et al. |
| 2012/0310507 A1* | 12/2012 | Auckenthaler ......... F01N 3/208 701/102 |

(Continued)

FOREIGN PATENT DOCUMENTS

| DE | 10 2008 036 418 | 2/2010 |
| DE | 10 2008 059 078 A1 | 5/2010 |

(Continued)

OTHER PUBLICATIONS

Cover Page of EP 2 061 957 A0 published May 27, 2009 (1 page).
(Continued)

*Primary Examiner* — Ngoc T Nguyen
(74) *Attorney, Agent, or Firm* — Crowell & Moring LLP

(57) ABSTRACT

A method for operating an exhaust system includes supplying exhaust gas to a first SCR catalytic converter. The method relates to a cold start, wherein a prior operating state of the first SCR catalytic converter existing prior to the cold start ascertained by a computer is considered. Aside from a water quantity that was adsorbed on the first SCR catalytic converter prior to the cold start, a reducing agent quantity that was adsorbed on the first SCR catalytic converter prior to the cold start, which quantity is assigned to the prior operating state is also taken into consideration to determine (Continued)

an actual reducing agent quantity on the first SCR catalytic converter. A compensation reducing agent quantity is metered as required and characterizes a differential value between a setpoint quantity and the actual reducing agent quantity, and being admixed to the exhaust gas upstream of the first SCR catalytic converter.

11 Claims, 3 Drawing Sheets

(52) U.S. Cl.
CPC ............... *F01N 2900/1602* (2013.01); *F01N 2900/1614* (2013.01)

(56) References Cited

U.S. PATENT DOCUMENTS

2016/0194996 A1  7/2016  Keppy et al.
2019/0178129 A1  6/2019  Funk et al.

FOREIGN PATENT DOCUMENTS

DE   11 2015 005 271 B4   10/2022
WO   WO 2008/031533 A1    3/2008

OTHER PUBLICATIONS

Gao, Z. et al., "Global kinetic modeling of $NH_3$-SCR with two sites of $NH_3$ storage on Cu-SSZ-13", Chemical Engineering Journal, 2021, pp. 1-15, vol. 406, Elsevier (15 pages).

International Search Report (PCT/ISA/210) issued in PCT Application No. PCT/EP2023/065950 dated Aug. 3, 2023 with English translation (5 pages).

German-language Written Opinion (PCT/ISA/237) issued in PCT Application No. PCT/EP2023/065950 dated Aug. 3, 2023 with English translation (8 pages).

German-language Office Action issued in German Application No. 10 2022 117 681.9 dated Jan. 25, 2023 with English translation (18 pages).

Reif, K., "Exhaust technology for internal combustion engines", Bosch Fachinformation Automobil, 2015, pp. 64-68, Springer Vieweg (10 pages).

Sjoevall, H. et al., "Detailed Kinetic Modeling of $NH_3$ SCR over Cu-ZSM-5", Applied Catalysis B: Environmental, 2009, pp. 138-153, vol. 92, Elsevier (16 pages).

\* cited by examiner

METHOD FOR OPERATING AN EXHAUST SYSTEM HAVING AN SCR CATALYTIC CONVERTER FOR AN INTERNAL COMBUSTION ENGINE, INTERNAL COMBUSTION ENGINE HAVING AN EXHAUST SYSTEM, AND A MOTOR VEHICLE HAVING AN INTERNAL COMBUSTION ENGINE

BACKGROUND AND SUMMARY

The invention relates to a method for operating an exhaust system for an internal combustion engine of a motor vehicle, exhaust gas emitted by the internal combustion engine being admitted to the exhaust system, in which method the exhaust gas is supplied to at least a first selective catalytic reduction ("SCR") catalytic converter of the exhaust system. Further aspects of the invention relate to an internal combustion engine having an exhaust system and to a motor vehicle having an internal combustion engine.

Systems for selective catalytic reduction designed to reduce nitrogen oxides in the exhaust gas are frequently used for the exhaust gas aftertreatment of exhaust gas emitted by modern internal combustion engines. Advantageously, use is made of ammonia which is released within the scope of thermolysis and subsequent hydrolysis of a urea solution used as reducing agent, which is added to the exhaust gas upstream of an SCR catalytic converter.

Various systems and methods for example contributing to the improvement of the exhaust gas aftertreatment and, in addition to that or as an alternative, to the reduction in urea consumption can be taken as known from the prior art.

For example, DE 10 2008 059 078 A1 describes an exhaust gas aftertreatment system for a self-igniting internal combustion engine, having a denox catalyst used in an exhaust gas line, a particulate filter and an introduction device for a reducing agent. In this context, the burner, the particulate filter, the introduction device and the denox catalyst are arranged in the specified sequence in the exhaust gas line.

By contrast, EP 2 061 957 A0 has disclosed a method for operating an SCR catalytic converter system for an internal combustion engine that has an SCR catalytic converter which is suitable for trapping a reducing agent and reducing nitrogen oxides (NOx) in the exhaust gas with the involvement of the reducing agent. The reducing agent or a chemical precursor of same is stored in a storage container and supplied to the SCR catalytic convert from there via a metering and conveying system. At least a partial flow of air flowing into the storage container or air present in the storage container is conditioned in such a way that the relative and/or specific humidity of the air is lowered within the storage container.

A problem addressed by the present invention is that of providing a method for improved exhaust gas aftertreatment of exhaust gas emitted by an internal combustion engine, especially following a cold start of the internal combustion engine, within the scope of which the exhaust gas flows through an exhaust system which is designed for exhaust gas aftertreatment and part of the internal combustion engine. Another problem addressed by the invention is that of providing an internal combustion engine having such an exhaust system and a motor vehicle having an internal combustion engine.

This problem is solved by a method having the features disclosed herein, by an internal combustion engine having the features disclosed herein, and by a motor vehicle having the features disclosed herein. Advantageous configurations with advantageous developments of the invention are also disclosed herein.

A first aspect of the invention relates to a method for operating an exhaust system for an internal combustion engine of a motor vehicle, exhaust gas emitted by the internal combustion engine being admitted to the exhaust system, in which method the exhaust gas is supplied to at least a first SCR catalytic converter of the exhaust system. At least one preoperational state of at least the first SCR catalytic converter is considered in the method. The at least one preoperational state, which is determined by a computing device, is present prior in time to a cold start of the internal combustion engine and hence also prior in time to a cold start of the exhaust system. The computing device can be designed as an engine control unit, abbreviated ECU, of the internal combustion engine. It is also conceivable that the computing device can be associated with a motor vehicle which can comprise the internal combustion engine. According to the present invention, the expression "preoperational state" should be understood to mean a state of at least the first SCR catalytic converter which the first SCR catalytic converter already has prior to the cold start, i.e. for example prior to a fueled operation of the internal combustion engine that initiates the cold start. For example, the preoperational state can arise due to a cooling phase, for example due to a cold start preceding the cold start in time, which is also referred to as previous cold start, to name but one example. The cold start can begin with the start of a fueled operation, i.e. an operation by burning fuel, of the internal combustion engine and can for example end once a light-off temperature of the first SCR catalytic converter has been reached.

The method comprises at least the following steps that are implemented following the cold start of the internal combustion engine:

In a step a), exhaust gas is admitted to the first SCR catalytic converter, whereby nitrogen oxides—which can also be referred to as nitrogen oxide constituents—are adsorbed by the first SCR catalytic converter while water is condensed out of the exhaust gas in at least one exhaust gas guide tube which is part of the exhaust system, is arranged upstream of the first SCR catalytic converter and supplies the exhaust gas to the first SCR catalytic converter. Exhaust gas can be created here as a consequence of a fueled operation of the internal combustion engine and supplied to the first SCR catalytic converter. On account of the cold start, at least a portion (water content) of water contained in the exhaust gas can condense on the cold exhaust gas guide tube.

In a step b), the exhaust gas guide tube is heated, whereby the water condensed out of the exhaust gas evaporates upstream of the first SCR catalytic converter, is supplied at least in part with the exhaust gas to the first SCR catalytic converter and is adsorbed on a first catalyst surface of the first SCR catalytic converter. As time progresses following the beginning of the cold start, the operationally related heating of the exhaust system and therefore of the exhaust gas guide tube as well can lead to at least partial evaporation of the water condensed in step a), and this water can thus transition from the liquid phase to the gas phase and can be supplied to the first SCR catalytic converter together with a water content contained in the exhaust gas in any case. The evaporated water and the water content contained in the exhaust gas can then be adsorbed at the first catalyst surface of the first SCR catalytic converter.

In a step c), there is an at least partial reduction of nitrogen oxide constituents stored on the first catalyst surface as a consequence of the catalyst surface being heated by an exothermic reaction of the water on the catalyst surface and by an increase in the exhaust gas temperature as a consequence of the fueled operation of the internal combustion engine. The exothermic reaction can be caused at the first catalyst surface by the water contained in the exhaust gas and by the water evaporated by the exhaust gas guide tube. Heating of the first SCR catalytic converter can be brought about both by the exothermic reaction and the increased duration of operation of the internal combustion engine following the beginning of the cold start.

In a step d), there is a determination of an actual amount of reducing agent associated with the first SCR catalytic converter that was adsorbed at the first catalyst surface, the determination being performed by the computing unit in a manner dependent on the amount of water on the first catalyst surface, dependent on a mass flow of the exhaust gas, dependent on a catalyst temperature of the first SCR catalytic converter, dependent on an amount of nitrogen oxide constituents adsorbed in the first SCR catalytic converter and dependent on a preliminary amount of reducing agent assigned to the preoperational state and adsorbed at the first catalyst surface. Modeling the actual amount of reducing agent, i.e. determining the actual amount of reducing agent on the basis of a model, can be implemented using the computing device, for example. By preference, the NOx trapping behavior, i.e. the nitrogen oxide trapping behavior, of at least the first SCR catalytic converter can be determined within the scope of this modeling.

In a step e), there is a comparison of a target amount of reducing agent associated with the first SCR catalytic converter with the actual amount of reducing agent using the computing device. The target amount of reducing agent can be a target value which depends on the operating state, in particular on the current operating state present following the cold start and during a warmup of the internal combustion engine, of the internal combustion engine and/or of the first SCR catalytic converter, which can be determined using the computing device (engine control unit, ECU).

The target amount of reducing agent can be obtained, for example, from modeling as known from the following publication: "Global kinetic modeling of NH3-SCR with two sites of NH3 storage on Cu-SSZ-13" by Zhiming et al., Chemical Engineering Journal 406 (2021) 127120.

In a step f), there is an addition of a metered amount of compensation reducing agent, which characterizes a difference in value between the target amount of reducing agent and the actual amount of reducing agent, using a first metering unit which is part of the exhaust system, is controlled by the computing device and as a consequence of being controlled by the computing device admixes the amount of compensation reducing agent to the exhaust gas upstream of the first SCR catalytic converter. Thus, the computing unit can control the first metering unit on the basis of the difference value, whereby the amount of compensation reducing agent, which can be characterized by the difference value, can be admixed to the exhaust gas on the basis of the first metering unit.

The invention is based on the insight that the greater the amount of water on the catalyst surface, the fewer nitrogen oxide constituents can be trapped and converted at the first SCR catalytic converter. Admixing the amount of compensation reducing agent, as ascertained on the basis of the computing device, can prevent the introduction of too much or too little reducing agent upstream of the first SCR catalytic converter, whereby particularly advantageous exhaust gas aftertreatment can be implemented overall.

In a further advantageous development of the invention, the actual amount of reducing agent is determined by the computing device in a manner dependent on at least a preliminary amount of water assigned to the preoperational state and adsorbed at the first SCR catalytic converter and/or dependent on at least a preliminary amount of nitrogen oxide constituents assigned to the preoperational state and adsorbed at the first SCR catalytic converter. The actual amount of reducing agent can be determined particularly accurately by using the preliminary amount of water and, in addition to that or as an alternative, the preliminary amount of nitrogen oxide constituents. In particular, this gives consideration to the state of the first SCR catalytic converter prior in time to the cold start, i.e. the state the first SCR catalytic converter has at the beginning of the cold start.

In a further advantageous development of the invention, use is made of a moisture trap which is part of the exhaust system, is arranged upstream of the first SCR catalytic converter and adsorbs at least some of the water condensed out of the exhaust gas on its moisture trap surface. This is advantageous since this yields a longer trap duration (adsorption duration) for the water, whereby a time of the exothermic reaction at the first SCR catalytic converter can be pushed back. As a result, the first SCR catalytic converter can take up more nitrogen oxides following the cold start and during the motor warmup of the internal combustion engine since some of the condensed water is trapped in the moisture trap, and overall dryer exhaust gas arrives at the first SCR catalytic converter during the cold start and during the motor warmup of the internal combustion engine.

In a further advantageous development of the invention, an oxidation catalyst and/or a nitrogen oxide adsorption catalyst is used as moisture trap. This is advantageous since this enables, firstly, the storage of water, i.e. also the exhaust gas aftertreatment, provided an oxidation catalyst and, in addition to that or as an alternative, a nitrogen oxide storage catalyst is used, i.e. utilized, as the moisture trap.

In a further advantageous development of the invention, a second SCR catalytic converter arranged downstream of the first SCR catalytic converter is used for exhaust gas aftertreatment. The second SCR catalytic converter enables a particularly advantageous exhaust gas aftertreatment over a broader spectrum of use.

A second aspect of the invention relates to an internal combustion engine having an exhaust system designed to implement an according to the first aspect of the invention. The exhaust system allows a particularly low-emission operation of the internal combustion engine.

A third aspect of the invention relates to a motor vehicle having an internal combustion engine according to the second aspect of the invention. This motor vehicle can be driven in particularly low-emission operation by way of the internal combustion engine.

The preferred embodiments presented in relation to one of the aspects, and their advantages, apply accordingly to the respective other aspects of the invention, and vice versa.

The features and feature combinations mentioned in the description above and the features and feature combinations mentioned in the description of the figures below and/or only shown in the figures are usable not only in the combination specified in each case but also in other combinations or on their own without departing from the scope of the invention.

Further advantages, features and details of the invention arise from the claims, the following description of preferred embodiments and on the basis of the drawings.

DETAILED DESCRIPTION OF THE DRAWINGS

Figure 1:
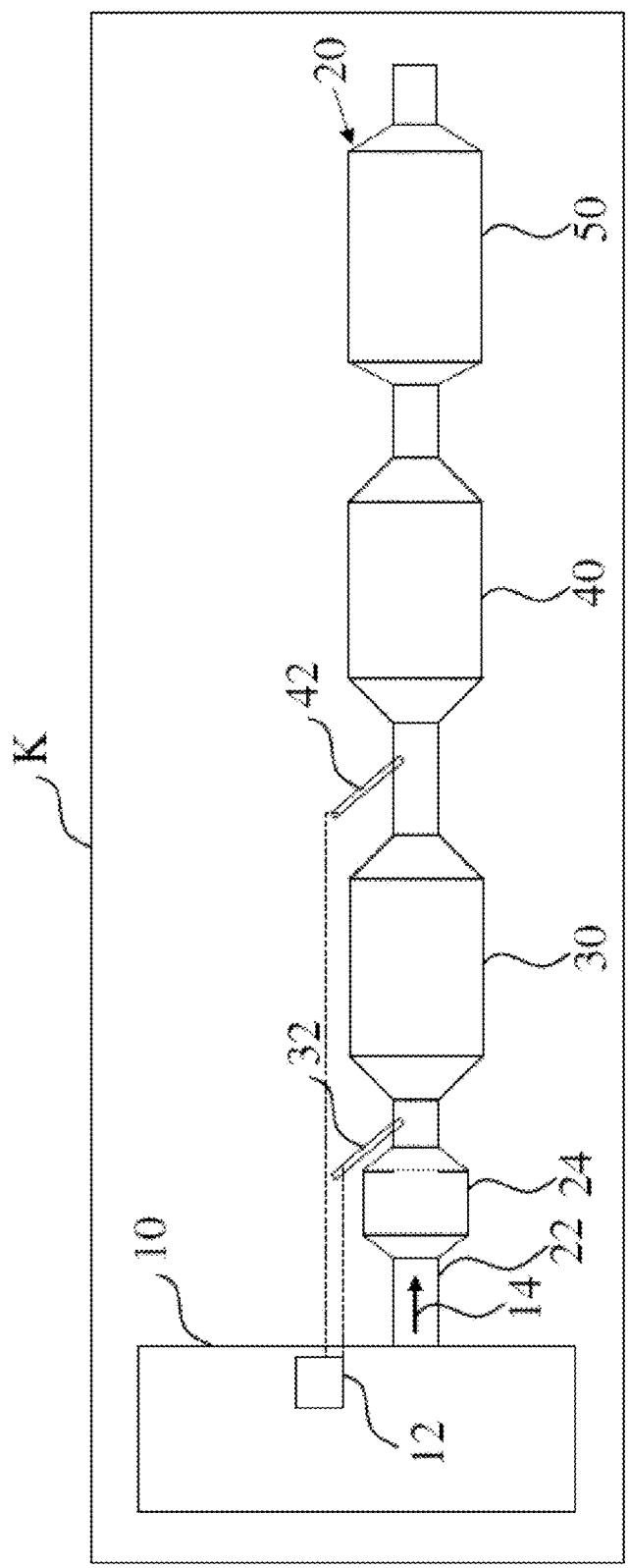
FIG. 1 shows a schematic illustration of a motor vehicle comprising an internal combustion engine having an exhaust system, through which exhaust gas emitted by the internal combustion engine flows, the exhaust gas passing through an exhaust gas guide tube of the exhaust system and, in succession, through a moisture trap designed as an oxidation catalyst, through a first SCR catalytic converter, a second SCR catalytic converter and a muffler of the exhaust system.

FIG. 1 shows, by way of example, a motor vehicle K having an internal combustion engine 10. The internal combustion engine 10 comprises an exhaust system 20. A method for operating the exhaust system 20 can be implemented using the internal combustion engine 10 and the exhaust system 20, the essential method steps of the method being depicted schematically in FIG. 3.

In the method for operating the exhaust system 20 of the internal combustion engine 10, exhaust gas 14 emitted by the internal combustion engine 10 is admitted to the exhaust system 20. The exhaust gas 14 guided through an exhaust gas guide tube 22 of the exhaust system 20 initially flows through a moisture trap 24 of the exhaust system 20. The moisture trap 24 can be designed as an oxidation catalyst and, in addition to that or in an alternative, as a nitrogen oxide adsorption catalyst. Subsequently, the exhaust gas 14 successively flows through a first SCR catalytic converter 30 which is near the motor, a second SCR catalytic converter 40 which is likewise used for exhaust gas aftertreatment and formed in the present case as an underbody SCR catalytic converter, and a muffler 50. The exhaust system 20 may still comprise further catalytic converters or filters, but these are not shown in detail in the present case. Serving the admixing of reducing agent, in particular aqueous urea solution, a first metering unit 32 is arranged upstream of the first SCR catalytic converter 30, and a second metering unit 42 is arranged upstream of the second SCR catalytic converter 40. The internal combustion engine 10 also comprises a computing device 12, also denoted ECU, on the basis of which the two metering units 32, 42 can be controlled, for example.

Figure 3:
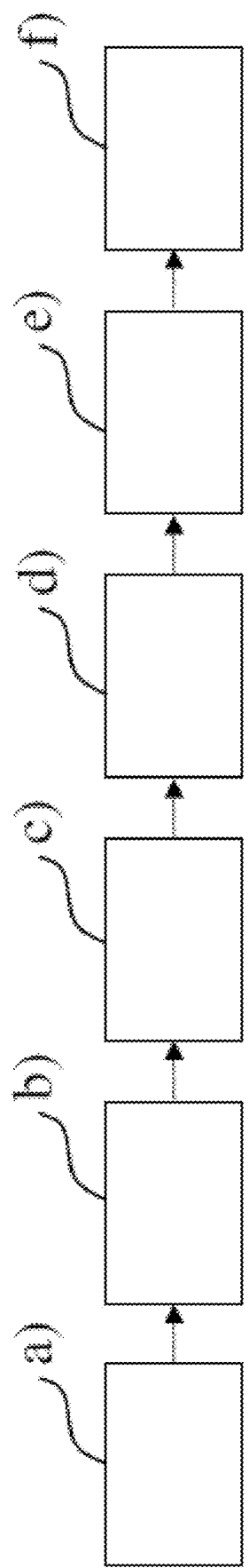
FIG. 3 shows a flowchart showing different method steps of a method for operating the exhaust system of the internal combustion engine driving the motor vehicle.

Steps a)-f) depicted in FIG. 3 are implemented following a cold start of the internal combustion engine 10. The method uses a preoperational state of at least the first SCR catalytic converter 30 which is calculated by the computing device 12 of the exhaust system 10 and present prior in time to the cold start.

In a step a), exhaust gas 14 is applied to the first SCR catalytic converter 30, whereby nitrogen oxides are adsorbed by the first SCR catalytic converter 30 while water is condensed out of the exhaust gas 14 in the exhaust gas guide tube 22 which is part of the exhaust system, is arranged upstream of the first SCR catalytic converter 30 and supplies the exhaust gas 14 to the first SCR catalytic converter 30. The moisture trap 24 of the exhaust system 20 arranged upstream of the first SCR catalytic converter 30 can adsorb at least some of the water condensed out of the exhaust gas 14 on a moisture trap surface of the moisture trap 24.

In a step b), the exhaust gas guide tube 22 is heated on account of the fueled operation of the internal combustion engine 10, whereby the water condensed out of the exhaust gas 14 evaporates upstream of the first SCR catalytic converter 30, is supplied at least in part with the exhaust gas 14 to the first SCR catalytic converter 30 and is adsorbed on a first catalyst surface of the first SCR catalytic converter 30.

In a step c), there is an at least partial reduction of nitrogen oxide constituents stored on the first catalyst surface as a consequence of the first catalyst surface being heated by an exothermic reaction of the water on the first catalyst surface and by an increase in the exhaust gas temperature as a consequence of the fueled operation of the internal combustion engine 10, the first catalyst surface being in the form of a zeolite surface in the present case.

In a step d), there is a determination of an actual amount of reducing agent associated with the first SCR catalytic converter 30 that was adsorbed at the first catalyst surface, the determination being performed by the computing unit 12 in a manner dependent on the amount of water on the first catalyst surface, dependent on a mass flow of the exhaust gas 14, dependent on a (first) catalyst temperature T1 of the first SCR catalytic converter 30, dependent on an amount of nitrogen oxide constituents adsorbed in the first SCR catalytic converter 30 and dependent on a preliminary amount of reducing agent assigned to the preoperational state and adsorbed at the first catalyst surface.

The actual amount of reducing agent can moreover be determined by the computing device 12 in a manner dependent on at least a preliminary amount of water assigned to the preoperational state and adsorbed at the first SCR catalytic converter 30 and in addition to that or in an alternative, dependent on at least a preliminary amount of nitrogen oxide constituents assigned to the preoperational state and adsorbed at the first SCR catalytic converter 30.

The stored nitrogen oxide constituents may comprise, firstly, nitrogen oxides resulting from the preoperational state, in particular the preliminary amount of nitrogen oxide constituents which might already be stored in the first SCR catalytic converter 30 prior to the cold start, and, secondly, nitrogen oxides additionally stored in the first SCR catalytic converter 30 following the cold start and during the warmup of the internal combustion engine 10. A similar statement also applies to water adsorbed at the first SCR catalytic converter 30, which can be composed of the preliminary amount of water (resulting from the preoperational state) and the amount of water (on the first catalyst surface) adsorbed at the first SCR catalytic converter 30 from the beginning of the cold start.

In a step e), there is a comparison of a target amount of reducing agent associated with the first SCR catalytic converter 30 with the actual amount of reducing agent using the computing device 12.

In a step f), there finally is an addition of a metered amount of compensation reducing agent, which characterizes a difference in value between the target amount of reducing agent and the actual amount of reducing agent, using the first metering unit 32 which is part of the exhaust system 20, is controlled by the computing device 12 and as a consequence of being controlled by the computing device 12 admixes the amount of compensation reducing agent to the exhaust gas 14 upstream of the first SCR catalytic converter 30.

It is clear that method steps a)-f) carried out in relation to the first SCR catalytic converter 30 can also be carried out in relation to the second SCR catalytic converter 40. In this case, an exhaust gas flow leaving the first SCR catalytic converter 30 and entering the second SCR catalytic converter 40 should form the basis for the exhaust gas entering the second SCR catalytic converter 40. In this case, consideration is given to the fact that not only the moisture trap 24 but also the first SCR catalytic converter 30 adsorbs water from the exhaust gas during the cold start. An exothermic, water-induced reaction at the second SCR catalytic converter 40 is correspondingly implemented with a time offset and hence at a later time than the exothermic reaction setting in at the first SCR catalytic converter 30.

Figure 2:
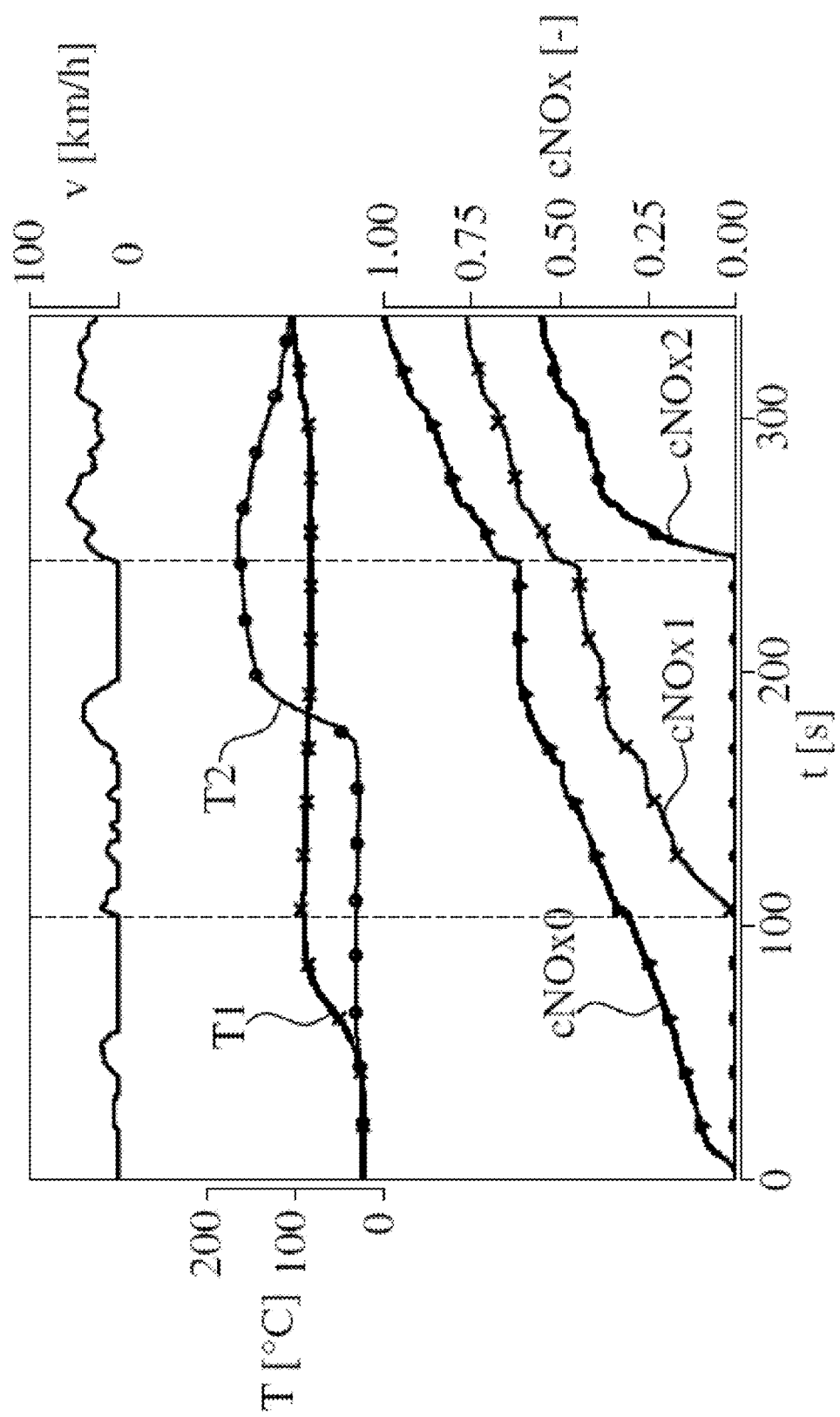
FIG. 2 shows a diagram in which, in the case of a cold start of the internal combustion engine, a vehicle speed of the motor vehicle, a first catalyst temperature of the first SCR catalytic converter, a second catalyst temperature of the second catalytic converter, and cumulative nitrogen oxide emissions of the exhaust gas upstream of the exhaust gas aftertreatment by the oxidation catalyst, cumulative nitrogen oxide emissions of the exhaust gas downstream of the first SCR catalytic converter, and cumulative nitrogen oxide emissions of the exhaust gas downstream of the second SCR catalytic converter are plotted over time.

For example, this is also evident from FIG. 2, a diagram in which the following quantities are plotted over time s with units of [s]: a temperature T in units of [° C.]; a vehicle speed v in units of [km/h]; a cumulative nitrogen oxide emission cNOx (dimensionless; [-]).

FIG. 2 shows that, at the beginning of the cold start at t=0, the first catalyst temperature T1 of the first SCR catalytic converter 30 increases much earlier than a second catalyst temperature T2 of the second SCR catalytic converter 40. The time-offset increase in the second catalyst temperature T2 results from the fact that the exothermic, water-induced reaction sets in later at the second SCR catalytic converter 40 than at the first SCR catalytic converter 30. The respective catalyst temperatures T1, T2 can be present at the respective catalyst surfaces of the respective SCR catalytic converters 30, 40. The catalyst temperatures T1, T2 can preferably be modeled or, for example, measured by respective temperature sensors in the exhaust system 20 that are signal connected to the computing device 12.

The longer the exhaust gas guide tube 22 and the greater a water storage capacity of the moisture trap 24, the longer condensed water can be retained before the water reaches the first SCR catalytic converter 30 and subsequently the second SCR catalytic converter 40. In other words, this can be used to delay a respective time of onset of the respective exothermic, water-induced reaction in the respective SCR catalytic converters 30, 40. This start of the respective exothermic reaction can be identified on the basis of respective steep increases in the respective catalyst temperatures T1, T2 in FIG. 2.

In this regard and with respect to FIG. 2, reference is made to the curves cNOx0, cNOx1 and cNOx2. In this case, cNOx0 specifies a nitrogen oxide concentration of the raw emission in the exhaust gas 14 of the internal combustion engine 10, which is present upstream of the moisture trap 24. Moreover, cNOx1 denotes a nitrogen oxide concentration of the exhaust gas 14 downstream of the first SCR catalytic converter 30 and upstream of the second SCR catalytic converter 40, whereas cNOx2 specifies a nitrogen oxide concentration of the exhaust gas 14 downstream of the second SCR catalytic converter 40.

As a result of the time offset, i.e. the delay of the exothermic reaction, drier exhaust gas arrives at the respective SCR catalytic converters 30, 40 for a corresponding longer period of time after the beginning of the cold start, whereby the first SCR catalytic converter 30 and the second SCR catalytic converter 40 can take up more nitrogen oxides after the cold start and during the motor warm-up of the internal combustion engine 10, and consequently this can bring about improved emissions control.

Under these circumstances, the method can bring about particularly as-needed reducing agent metering by way of the metering units 32, 42. Using the method, the nitrogen oxide trapping behavior of the first SCR catalytic converter 30 and of the second SCR catalytic converter 40 can be determined particularly accurately in a manner dependent on the aforementioned quantities, for example the quantities associated with the preoperational state and the quantities present during the cold start (for example the catalyst temperatures T1, T2).

LIST OF REFERENCE SIGNS

10 Internal combustion engine
12 Computing device
14 Exhaust gas
20 Exhaust system
22 Exhaust gas guiding tube
24 Moisture trap
30 First SCR catalytic converter
32 First metering unit
40 Second SCR catalytic converter
42 Second metering unit
50 Muffler
K Motor vehicle
t Time
T Temperature
T1 First catalyst temperature
T2 Second catalyst temperature
V Vehicle speed
cNOx Cumulative nitrogen oxide emission
cNOx0 Nitrogen oxide concentration, raw emission
cNOx1 Nitrogen oxide concentration
cNOx2 Nitrogen oxide concentration

The invention claimed is:

1. A method for operating an exhaust system for an internal combustion engine of a motor vehicle comprising:
    following a cold start of the internal combustion engine, and making use of at least one preoperational state of at least a first selective catalytic reduction ("SCR") catalytic converter that is calculated by a computer and present prior in time to the cold start:
    admitting exhaust gas emitted by the internal combustion engine to the first SCR catalytic converter in the exhaust system, whereby nitrogen oxides are adsorbed by the first SCR catalytic converter while water is condensed out of the exhaust gas in at least one exhaust gas guide tube which is part of the exhaust system and is arranged upstream of the first SCR catalytic converter and which supplies the exhaust gas to the first SCR catalytic converter;
    heating the exhaust gas guide tube, whereby the water condensed out of the exhaust gas evaporates upstream of the first SCR catalytic converter, is supplied at least in part with the exhaust gas to the first SCR catalytic converter, and is adsorbed on a first catalyst surface of the first SCR catalytic converter;
    at least partly reducing nitrogen oxide constituents stored on the first catalyst surface as a consequence of the catalyst surface being heated by an exothermic reaction of the water on the catalyst surface and by an increase in an exhaust gas temperature as a consequence of fueled operation of the internal combustion engine;

determining, by a computer, an actual amount of reducing agent associated with the first SCR catalytic converter that was adsorbed at the first catalyst surface dependent on:
- an amount of water on the first catalyst surface,
- a mass flow of the exhaust gas,
- a catalyst temperature of the first SCR catalytic converter,
- an amount of nitrogen oxide constituents adsorbed in the first SCR catalytic converter, and
- dependent on a preliminary amount of reducing agent assigned to the preoperational state and adsorbed at the first catalyst surface;

comparing a target amount of reducing agent associated with the first SCR catalytic converter with the actual amount of reducing agent using the computer; and adding a metered amount of compensation reducing agent, which characterizes a difference in value between the target amount of reducing agent and the actual amount of reducing agent, using a first metering device that is part of the exhaust system, is controlled by the computer, and as a consequence of being controlled by the computer, admixes the amount of compensation reducing agent to the exhaust gas upstream of the first SCR catalytic converter.

2. The method according to claim 1, comprising:
determining the actual amount of reducing agent by the computer in a manner dependent on at least a preliminary amount of water assigned to the preoperational state and adsorbed at the first SCR catalytic converter, and/or dependent on at least a preliminary amount of nitrogen oxide constituents assigned to the preoperational state and adsorbed at the first SCR catalytic converter.

3. The method according to claim 1, comprising:
using a moisture trap that is part of the exhaust system and is arranged upstream of the first SCR catalytic converter to adsorb at least some of the water condensed out of the exhaust gas on a moisture trap surface.

4. The method according to claim 3, comprising:
using an oxidation catalyst and/or a nitrogen oxide adsorption catalyst as the moisture trap.

5. The method according to claim 1, comprising:
using a second SCR catalytic converter of the exhaust system arranged downstream of the first SCR catalytic converter for exhaust gas aftertreatment.

6. An internal combustion engine comprising an exhaust system comprising:
- a first selective catalytic reduction ("SCR") catalytic converter;
- at least one exhaust gas guide tube arranged upstream of the first SCR catalytic converter; and
- a computer, wherein the first SCR catalytic converter is configured to admit exhaust gas emitted by the internal combustion engine, and absorb nitrogen oxides while water is condensed out of the exhaust gas in the at least one exhaust gas guide tube which supplies the exhaust gas to the first SCR catalytic converter, wherein the exhaust gas guide tube is configured to be heated, whereby the water condensed out of the exhaust gas evaporates upstream of the first SCR catalytic converter, is supplied at least in part with the exhaust gas to the first SCR catalytic converter, and is adsorbed on a first catalyst surface of the first SCR catalytic converter, wherein nitrogen oxide constituents stored on the first catalyst surface are at least partly reduced as a consequence of the catalyst surface being heated by an exothermic reaction of the water on the catalyst surface and by an increase in an exhaust gas temperature as a consequence of fueled operation of the internal combustion engine, wherein the computer is configured to:
determine an actual amount of reducing agent associated with the first SCR catalytic converter that was adsorbed at the first catalyst surface dependent on:
- an amount of water on the first catalyst surface,
- a mass flow of the exhaust gas,
- a catalyst temperature of the first SCR catalytic converter,
- an amount of nitrogen oxide constituents adsorbed in the first SCR catalytic converter, and
- a preliminary amount of reducing agent assigned to a preoperational state and adsorbed at the first catalyst surface;

compare a target amount of reducing agent associated with the first SCR catalytic converter with the actual amount of reducing agent using the computer; and add a metered amount of compensation reducing agent, which characterizes a difference in value between the target amount of reducing agent and the actual amount of reducing agent, using a first metering device that is part of the exhaust system, is controlled by the computer, and as a consequence of being controlled by the computer, admixes the amount of compensation reducing agent to the exhaust gas upstream of the first SCR catalytic converter.

7. The internal combustion engine according to claim 6, wherein the computer is configured to:
determine the actual amount of reducing agent in a manner dependent on at least a preliminary amount of water assigned to the preoperational state and adsorbed at the first SCR catalytic converter, and/or dependent on at least a preliminary amount of nitrogen oxide constituents assigned to the preoperational state and adsorbed at the first SCR catalytic converter.

8. The internal combustion engine according to claim 6, comprising:
a moisture trap that is part of the exhaust system and is arranged upstream of the first SCR catalytic converter and configured to adsorb at least some of the water condensed out of the exhaust gas on a moisture trap surface.

9. The internal combustion engine according to claim 8, comprising:
an oxidation catalyst and/or a nitrogen oxide adsorption catalyst as the moisture trap.

10. The internal combustion engine according to claim 6, comprising:
a second SCR catalytic converter of the exhaust system arranged downstream of the first SCR catalytic converter and configured to perform exhaust gas aftertreatment.

11. A motor vehicle comprising:
the internal combustion engine according to claim 6.

* * * * *